United States Patent [19]

Otloski et al.

[11] Patent Number: 4,916,173

[45] Date of Patent: Apr. 10, 1990

[54] POLYURETHANE SYNTACTIC FOAM MODELING STOCK

[75] Inventors: Elizabeth L. Otloski, Haslett; George H. Sollner, Lansing, both of Mich.

[73] Assignee: Ciba-Geigy Corporation, Ardsley, N.Y.

[21] Appl. No.: 190,796

[22] Filed: May 6, 1988

[51] Int. Cl.$^4$ ............................................. C08J 9/32
[52] U.S. Cl. ..................................... 523/219; 521/54; 523/218; 528/77
[58] Field of Search .................. 523/218, 219; 521/54; 528/77

[56] References Cited

U.S. PATENT DOCUMENTS

| | | |
|---|---|---|
| 3,993,608 | 11/1976 | Wells .......................... 260/2.5 AW |
| 4,038,238 | 7/1977 | Cravens ....................... 260/33.6 UB |
| 4,075,151 | 2/1978 | Olstowski .................... 260/33.21 R |
| 4,082,702 | 4/1978 | Harper .......................... 260/2.5 AK |
| 4,303,729 | 12/1981 | Torobin ................................ 428/327 |
| 4,303,730 | 12/1981 | Torobin ................................ 428/333 |
| 4,476,258 | 10/1984 | Hiles ..................................... 523/212 |
| 4,518,718 | 5/1985 | Frost ..................................... 521/122 |
| 4,526,906 | 7/1985 | Wegner ................................ 521/107 |
| 4,528,305 | 7/1985 | Henry ................................... 523/219 |

*Primary Examiner*—Morton Foelak
*Attorney, Agent, or Firm*—Harry Falber

[57] ABSTRACT

Polyurethane syntactic foam compositions having high glass transition temperatures and low coefficients of thermal expansion suitable for use in tooling applications as modeling stock are prepared from polymeric isocyanate, an amine-based polyol, a polyether triol, molecular sieve material and hollow microspheres.

17 Claims, No Drawings

POLYURETHANE SYNTACTIC FOAM MODELING STOCK

Acceptable modeling stock must have such properties that its dimensions are essentially unchanged over a wide variation in environmental conditions (temperature, humidity) so that the dimensions of a workpiece made from such stock can meet the increasingly stringent specifications imposed by end-use considerations such as those of the aerospace industry.

Laminated wood modeling stock and plaster models exhibit numerous disadvantages. For example, wood models made from such stock swell and warp when exposed to adverse weather conditions, especially high temperature and humidity causing the parts and tools made from such wood models to be out of tolerance. Plaster models are fragile.

Metals, particularly aluminum, clearly overcome the problems associated with laminated wood modeling stock, but metal is relatively expensive, heavy and difficult as well as slow to machine to the desired shape. Nonetheless, a metal such as aluminum has been the standard modeling stock for preparing large workpieces of exact dimensions.

Attempts to overcome the problems associated with aluminum, have focused on hand lay-up epoxy laminate structures. These structures have the disadvantages of being very costly and labor intensive in their construction requirements and not being adaptable to robotic construction coupled with the built-in inescapable flaws where adjoining edges of cloth in said laminates occur. These disadvantages would be exacerbated in the preparation of very large workpieces.

Improved epoxy resin modeling stock is reflected in U.S. Pat. No. 4,528,305 in terms of machinability with computer aided cutting equipment and physical characteristics approaching those of aluminum. However, such systems will suffer from the need for multiple processing operations, higher cost and particularly extended cycle times in the mold. Other epoxy systems are identified in U.S. Pat. No. 4,595,623.

By way of further background information, U.S. Pat. No. 4,886,846 describes a method of testing the accuracy of a cutting machine tool control program. This patent relates to the now common practice of preparing a "control program" by punched card, magnetic tape or computer disc, on a machine tool to make a prototype workpiece. The control program thus prepared is then available to control the preparation of such workpieces on any similar machine tool. The invention of U.S. Pat. No. 3,886,846 provides a less expensive, easily machined, thermosetting plastic block as a working stock to test whether the control program applied to the machine tool to be used to manufacture the actual work pieces will in practice machine the working stock to the desired dimensions. This allows for savings in time and expense in testing the control programs. The thermosetting plastic block is cast polyurethane foam or extended polyester which is glued together with standard epoxy putty.

In addition, block material prepared from polyurethane foam is commercially available for use as a modeling stock. Despite the major improvements provided by this material, higher glass transition temperatures, lower coefficients of thermal expansion closer to materials utilized for composite parts and further improved physical properties are still required in view of the greater physical and configurational demands being placed on composite parts.

The object of the instant invention is to provide a synthetic modeling material approaching composite part materials in its coefficient of thermal linear expansion and having the advantages of lower cost, improved physical properties, simpler and quicker processing, and the like.

It has now been surprisingly discovered that a polyurethane syntactic foam formulation prepared from a polymeric isocyanate, an amine-based polyol, a polyether triol, a molecular sieve and hollow microspheres provides the aforementioned performance benefits. Thus, the foam can be readily used as modeling stock at ambient and elevated temperatures. It is available for use with computer aided design methods for the production of tools for composite part manufacture. Of particular interest, the material allows for the substantial reduction in operating steps required for final tool production. Whereas conventional procedures require mylars to produce templates to produce master models by the conventional technique known as "splining", plaster or room temperature epoxy "splash" to provide a negative which, in turn, is utilized to make a high temperature intermediate, use of the intermediate to prepare a prepreg curing tool, and finally use of the latter to make a composite part, and whereas even the improved systems only eliminate the mylars and template operations, the improved model stock of this invention utilizes computer-aided design data to directly make the high temperature intermediate. Thus, mylars, templates, master models and splashes are totally eliminated.

In addition, the instant polyurethane materials exhibit higher glass transition temperatures to facilitate their use at elevated temperatures. They exhibit reduced coefficients of thermal expansion and coefficients which are closer in value to that of materials utilized to make composite parts. The materials further show improved mechanical strength to permit their use under autoclave pressures and temperatures.

The instant invention thus comprises a curable polyurethane prepared from a polymeric isocyanate, appropriate blends of an amine-based polyol and a polyether triol, a molecular sieve and microspheres. The cured product provides the indicated elevated glass transition temperatures and the low coefficients of thermal expansion.

The polyisocyanates which are applicable to the instant invention include any of those commonly employed in making polyurethane plastics including polyarylisocyanates such as polymethylene polyphenyl isocyanate, 4,4'-diphenylmethane diisocyanate and modifications thereof e.g. containing carbodiimide linkages, toluene diisocyanate, phenylindane diisocyanate, aliphatic polyisocyanates such as hexamethylene diisocyanate, isophorone diisocyanate, 2,2,4-trimethylhexamethylene diisocyanate, and blends thereof.

Suitable polyether triols include aliphatic alkylene glycol polymers having an alkylene unit composed of at least two carbon atoms. Typical ones are prepared through the polymerization of such alkylene oxides as ethylene oxide, propylene oxide, butylene oxide and tetrahydrofuran, and di- and polyfunctional alcohols such as water, propylene glycol, glycerol, trimethylol propane, hexanetriol, pentaerythritol and sucrose. Applicable materials will generally have molecular weights ranging from 400-7000. A typical polyether triol is available from Olin Corp. under the designation POLY-G 30-280.

The amine-based polyols generally have an equivalent weight of from 30 to 6000 and a viscosity of from 1.0 to 20,000 centipoises at 25° C.-60° C. A wide variety of aromatic and aliphatic polyamines may form part of the amine-based polyols, such di- and polyamines including ethylenediamine, triethanolamine and toluenediamine, to be reacted with, for example, the alkylene oxides noted above. Amine-based triols are preferred. Typical amine-based polyols are available from Texaco Corp. under the designation THANOL SF 265 and from BASF Corp. under the designation PLURACOL 355.

The molecular sieve functions as a moisture scavenger which reduces foaming in the molding process and yields a product of uniform density. Such sieves are well known to those skilled in the art, being zeolites with open-network structures.

The syntactic foam composites prepared in accordance with the present invention contain a relatively uniform distribution of hollow microspheres. Hollow microspheres are usually hollow thermoplastic spheres composed of acrylic type resins such as polymethylmethacrylate, acrylic modified styrene, polyvinylidene chloride or copolymers of styrene and methyl methacrylate; phenolic resins; or hollow glass, silica, ceramic or carbon spheres that are very light in weight and act as a lightweight filler in the syntactic foam. Glass microspheres are preferred. These microspheres preferably have a diameter in the range of about 5 to about 250 micrometers. Methods for the production of these hollow microspheres are well known in the art. Such microspheres are readily available commercially. These hollow microspheres can be compressed somewhat when subjected to external pressure. However, they are relatively fragile and will collapse or fracture at high pressures. Therefore, there is a pressure range under which the microspheres can effectively operate. It has been determined that when hollow glass microspheres are employed in the practice of the present invention, syntactic foam composites can be molded at pressures up to the limit of the hollow microspheres without fracture, with molding pressures in the range of about 700 to about 900 psi being preferred. The hollow microspheres facilitate machining of the stock, lead to reduced density and, most importantly, serve to reduce the coefficient of thermal expansion.

The polyurethane systems of this invention are prepared by admixing the polyisocyanate with the polyols. The molecular sieve and microspheres as well as optional additives are generally included with the polyols. Generally stoichiometric amounts of polyisocyanate and polyol are utilized, with the possibiity of deviating from the stoichiometric amount by utilizing up to about 25% excess isocyanate or up to about 2% excess polyol. Solid, thermoset polyurethane elastomers are obtained within about 20-40 minutes at room temperature. Post-curing/annealing may then occur for up to about 48 hours at ambient temperatures and then up to about 20 hours at 130°-140° C.

In terms of concentrations, the polymeric isocyanate is present in from about 30-55% and preferably 40-45%; the amine-based polyol from about 9-35%, preferably 15-30% and most preferably 20-25%; the polyether triol from 5-40%, preferably 5-20% and most preferably 10-15%; the molecular sieve from 3-10% and preferably 5-8%; and the microspheres from 10-40% and preferably 10-20%; these percentages being based on the weight of the filled polyurethane. The relationship of the polyols is of particular significance in order to achieve high glass transition temperatures and proper reactivity, i.e. control of the reaction.

Various optional ingredients may be included in the system. For example, catalysts are known to those skilled in the art and may comprise, for example, heavy metals utilized in amounts of about 0.1% metal, by weight of polyol, e.g. organo tin, organo zinc, mercury, bismuth and lead compounds. Tertiary amines may also be utilized.

Other optional additives include anti-foaming agents such as glycerine, an ethyl acrylate-2-ethylhexyl acrylate copolymer, dimethyl siloxane copolymers and silicones; wetting agents such as solutions of a salt of unsaturated polyamine amides and high M.W. esters, neoalkoxy zirconate and titanate or coordinate titanate coupling agents; antioxidants such as esters of $\beta$-(3,5-di-tert.butyl-4-hydroxyphenyl)-propionic acid with monohydric or polyhydric alcohols, for example, methanol, octadecanol, 1,6-hexanediol, neopentylglycol, thiodiethyleneglycol, diethyleneglycol, triethyleneglycol, pentaerythritol, tris-hydroxyethyl isocyanurate, and dihydroxyethyl oxalic acid diamide; UV absorbers and light stabilizers such as 2-(2'-hydroxyphenyl)benzotriazoles and sterically hindered amines as bis-(2,2,6,6-tetramethylpiperidyl)-sebacate, bis-(1,2,2,6,6-pentamethylpiperidyl)-sebacate, n-butyl-3,5-di-tert.butyl-4-hydroxyphenyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylendiamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethyl piperazinone); plasticizers such as phthalates, adipates, glutarates, epoxidized vegetable oils, and the like; fungicides; pigments; dyes; reactive dyes; flame retardants; and the like.

Additional fillers or combinations of fillers may also be present such as calcium carbonate, mica, glass fibers, silica-alumina ceramic alloy, hydrated alumina silicates, calcium sulfate, talc and solid microspheres. These optional fillers can be used in concentrations which replace up to a maximum of about 85%, by weight, of the hollow microsphere content.

In order to meet the overall requirements for an acceptable cured polyurethane foam modeling stock, the cured composition should have a glass transition temperature (Tg) over 100° C. and preferably over 125° C., and a coefficient of thermal expansion (CTE) of less than $70 \times 10^{-6}$ in/in/°C. in the $-30°$-$30°$ C. range and preferably less than $50 \times 10^{-6}$ in/in/°C., and less than $80 \times 10^{-6}$ in/in/°C. in the 25°-100° C. range and preferably less than $60 \times 10^{-6}$ in/in/°C.

As previously noted, these cured polyurethanes function as modeling stock and are readily machinable by conventional tools or computer-aided design data to produce master models. They exhibit improved performance over a commercial polyurethane material in terms of higher glass transition temperatures, reduced CTE, facilitating their use with large models and achieving closer proximity to the CTE of composite material parts (e.g. graphite composite part = $6.0 \times 10^{-6}$ in/in/°C. in the 25°-100° C. range) and increased strength characteristics. They are easier and more economical to fabricate than known epoxy model blocks. Of particular significance, the number of steps required to go from conception to final tool production is reduced to two from the six steps prevalent in current technology.

The following examples illustrate the preferred embodiments of the invention. In these examples, all parts given are by weight unless otherwise specified.

EXAMPLE 1

This example illustrates the preparation of typical polyurethane systems of the invention.

Each of the formulations noted in the table below is prepared by charging the polyols and molecular sieve paste to a Hobart blender, mixing for 1-2 minutes at low speed, admixing the filler and stirring until wet and then mixing at low speed for an additional seven minutes.

The various castings are prepared by weighing fifty grams of the filled polyol formulation into a container, adding the indicated amount of isocyanate, mixing for approximately two minutes, casting a 1.3 cm.×1.3 cm.×26.7 cm. bar, retaining the bar for 78 hours at room temperature and post-curing/annealing for 20 hours at 130° C. The sample size for testing is 0.64 cm×1.14 cm×10.2 cm.

Each of the systems prior to casting and curing is evaluated as follows:

Gel Time and % Expansion—Two hundred grams of filled polyol are mixed with the indicated amount of isocyanate for one minute. Thereafter, 300 grams of the mixed formulation are poured into a beaker, the initial height is marked, gelation is checked with a wooden probe and, after gelation, the final height is marked. "Gel Time" is noted as the time elapsed from the start of mixing until initial formation of a hardened mass. "% Expansion" is the height change divided by the initial height times 100.

Each of the cured bars is evaluated as follows:
Density—FTMS 406, Method 5012.
Glass Transition Temperature (Tg)—ASTM D-4065 using a DuPont 9900 DMA 982 using the Loss Modulus Curve.
Estimated Use Temperature—ASTM D-4065 using a DuPont 9900 DMA 982 using the Storage Modulus Curve.
Coefficient of Thermal Expansion (CTE)—ASTM D-3386 using a DuPont 9900 TMA 943 with samples annealed for one hour at 130° C. prior to testing.

| | parts by weight | | | |
|---|---|---|---|---|
| | 1 | 2 | 3 | 4 |
| Polyol System | | | | |
| Amine-based triol[1] | 39.5 | 45.5 | 36.4 | 36.4 |
| Polyether triol[2] | 21.2 | 15.2 | 24.3 | 24.3 |
| Molecular sieve paste[3] | 11.8 | 11.8 | 11.8 | 11.8 |
| Hollow Glass microballoons (20-130 micron size) | 27.5 | 27.5 | 27.5 | 5.5 |
| Mica | — | — | — | 11.0 |
| Milled glass fibers | — | — | — | 11.0 |
| Polyisocyanate | | | | |
| Polymethylene polyphenyl isocyanate (isocyanate/polyol system) | 76/100 | 77/100 | 75/100 | 75/100 |
| Mixed Properties | | | | |
| Gel Time (min.) | ~6.5 | 4.5-5.0 | 6.8 | ~7.0 |
| % Expansion | nil | nil | nil | nil |
| Cured Properties | | | | |
| Density (g/cc) | 0.8068 | 0.7971 | 0.8090 | 1.126 |
| Tg (°C.) | 141.9 | 144.3 | 141.9 | 144.8 |
| Est. Use Temp. (°C.) | 121.6 | 122.6 | 122.5 | 125.2 |
| CTE (× 10$^{-6}$ in/in/°C.) | | | | |
| −30°-30° C. | 44.25 | 46.05 | 45.1 | 52.5 |
| 25°-100° C. | 49.85 | 49.95 | 49.65 | 57.6 |

[1]-TERCAPUR G-200 from Carbochimique S.A.
[2]-PLURACOL TP-440 from BASF
[3]-PURMOL 3A Paste from Zeochem These data thus illustrate the excellent performance characteristics of the instant systems.

EXAMPLE 2

This example illustrates the use of different amine based triols and different polyol ratios. In each instance, the polyols are mixed for two minutes and the required amount of polymethylene polyphenyl isocyanate is added with mixing for two minutes. A 1.3 cm×1.3 cm×26.7 cm bar is cast, left for 24-96 hours at room temperature and post-cured/annealed for twenty hours at 130° C. The sample size for testing is 0.64 cm×1.14 cm×10.2 cm.

| Polyether triol/ Amine-based triol | Weight Ratio | Weight Ratio (iso:polyol) | Tg (°C.) | Ex. Use Temp (°C.) |
|---|---|---|---|---|
| 2/1 | 60:40 | 114:100 | 136.4 | 121.4 |
| 2/1 | 50:50 | 117:100 | 139.1 | 123.4 |
| 2/1 | 25:75 | 124:100 | 145.3 | 129.3 |
| 2/4 | 50:50 | 120:100 | 150.5 | 129.8 |
| 2/4 | 25:75 | 128:100 | 160.6 | 143.6 |
| 2/5* | 50:50 | 136:100 | 141.7 | 124.4 |
| 2/5* | 25:75 | 152:100 | 141.1 | 124.1 |
| 2/6* | 50:50 | 128:100 | 129.8 | 110.0 |
| 2/6* | 25:75 | 141:100 | 151.6 | 129.4 |

4 - NIAX Polyol HPP - 520 from Union Carbide Corp.
5 - THANOL SF 265 from Texaco Corp.
6 - POLY-G 37-600 from Olin Corp.
*foaming occurred

EXAMPLE 3

The following formulations are prepared by charging the polyol blend ingredients into a Hobart blender and mixing at low speed for ten minutes. Formulations containing calcium stearate are prepared by mixing the amine-based triol, molecular sieve paste and calcium stearate in the Hobart for twenty minutes at low speed to disperse the stearate and then adding the remaining ingredients and mixing for an additional ten minutes at low speed. The castings are prepared by weighing filler and polyol blend to 100 grams in a container and mixing for two minutes or until the filler(s) is wet out, adding the indicated amount of isocyanate, mixing for approximately two minutes, casting a 1.3 cm×1.3 cm×26.7 cm bar, retaining the bar for 20-24 hours at room temperature and post-curing/annealing for 20 hours at 130° C. The sample size for testing is 0.64 cm×1.14 cm×10.2 cm. Test procedures are described in Example 1.

| | Parts by weight | | | | | | | | | | | |
|---|---|---|---|---|---|---|---|---|---|---|---|---|
| | 5 | 6* | 7 | 8 | 9 | 10* | 11* | 12* | 13* | 14 | 15 | 16* |
| Polyol System | | | | | | | | | | | | |
| Amine-based triol[1] | 21.7 | 21.7 | 21.7 | 21.7 | 20.8 | 20.8 | 20.8 | 20.8 | 62.7 | 62.7 | 62.7 | 62.7 |
| Polyether triol[2] | 61.9 | 61.9 | 61.891 | 61.891 | 59.3 | 59.3 | 59.292 | 59.292 | 20.9 | 20.9 | 20.9 | 20.9 |
| Molecular Sieve paste[3] | 16.4 | 16.4 | 16.4 | 16.4 | 15.7 | 15.7 | 15.7 | 15.7 | 16.4 | 16.4 | 16.4 | 16.4 |
| Glass microballoons (as Ex.1)** | 20.0 | 30.0 | 20.0 | 25.0 | 20.0 | 25.0 | 20.0 | 25.0 | 15.0 | 10.0 | 5.0 | 30.0 |
| Acicular Mica** | — | — | — | — | — | — | — | — | 15.0 | 20.0 | 25.0 | — |
| Bismuth catalyst | — | — | 0.009 | 0.009 | — | — | 0.008 | 0.008 | — | — | — | — |
| Calcium stearate | — | — | — | — | 4.2 | 4.2 | 4.2 | 4.2 | — | — | — | — |
| Polyisocyanate | | | | | | | | | | | | |
| Polymethylene polyphenyl isocyanate (Isocyanate/polyol) | 77/100 | 67/100 | 77/100 | 72/100 | 74/100 | 69/100 | 74/100 | 69/100 | 68/100 | 68/100 | 68/100 | 68/100 |
| Cured Properties | | | | | | | | | | | | |
| Density (g/cc) | 0.889 | 0.773 | 0.888 | 0.820 | 0.888 | 0.835 | 0.887 | 0.838 | 0.959 | 1.051 | 1.151 | 0.75 |
| Tg (°C.) | 131.5 | 128.9 | 130.8 | 131.0 | 127.9 | 126.4 | 131.6 | 132.6 | 139.2 | 139.0 | 139.6 | 139.0 |
| Est. Use Temp. (°C.) | 112.2 | 109.3 | 112.5 | 111.1 | 107.9 | 104.9 | 113.8 | 114.6 | 119.8 | 119.9 | 120.3 | 119.5 |
| CTE ($\times 10^{-6}$ in/in/°C.) | | | | | | | | | | | | |
| −30°–30° C. | 49.7 | 41.8 | 52.1 | 48.6 | 51.0 | 49.5 | 51.0 | 48.0 | 45.5 | 48.7 | 49.7 | 43.3 |
| 25°–100° C. | 59.3 | 48.4 | 63.1 | 54.4 | 56.8 | 56.5 | 61.5 | 55.0 | 53.1 | 57.6 | 59.9 | 47.2 |

*Thick filler loading
**Filler content in these formulations is the % loading per 100 parts of the filled polyol system.

In summary, this invention provides novel improved polyurethane systems for use as modeling stock. Variations may be made in procedures, proportions and materials without departing from the scope of the invention as defined by the following claims.

What is claimed is:

1. A curable polyurethane composition consisting essentially of a blend of (a) from 30–55% of a polyisocyanate, (b) from 9–35% of an amine-based polyol, (c) from 5–40% of a polyether triol, (d) from 3–10% of a molecular sieve and (e) from 10–40% of a hollow microsphere filler, all percentages being by weight of the total composition.

2. The composition of claim 1, wherein component (a) is present in a concentration of from 40–45%, component (b) from 15–30%, component (c) from 5–20%, component (d) from 5–8%, and component (e) from 10–20%, all percentages being by weight of the total composition.

3. The composition of claim 1, wherein component (a) is a polymethylene polyphenyl isocyanate.

4. The composition of claim 1, wherein component (b) is an amine-based triol.

5. The composition of claim 1, wherein component (e) is hollow glass microspheres having a diameter of from 5–250 micrometers.

6. A shaped article consisting essentially of the polyurethane composition of claim 1 subsequent to the curing thereof.

7. The article of claim 6, wherein component (a) is present in a concentration of from 40–45%, component (b) from 15–30%, component (c) from 5–20%, component (d) from 5–8% and component (e) from 10–20%, all percentages being by weight of the total composition.

8. The article of claim 6 having a glass transition temperature over 100° C. coupled with a coefficient of thermal linear expansion of less than $70 \times 10^{-6}$ in/in/°C. in the −30°–30° C. range and of less than $80 \times 10^{-6}$ in/in/°C. in the 25°–100° C. range.

9. The article of claim 8 having a glass transition temperature over 125° C. coupled with a coefficient of thermal linear expansion of less than $50 \times 10^{-6}$ in/in/°C. in the −30°–30° C. range and of less than $60 \times 10^{-6}$ in/in/°C. in the 25°–100° C. range.

10. The article of claim 6, wherein component (a) is a polymethylene polyphenyl isocyanate.

11. The article of claim 6, wherein component (b) is an amine-based triol.

12. The article of claim 6, wherein component (b) is derived from an aliphatic or aromatic diamine.

13. The article of claim 6, wherein component (c) is an aliphatic alkylene glycol polymer having an alkylene unit of at least two carbon atoms.

14. The article of claim 6, wherein component (e) is hollow glass microspheres having a diameter of from 5–20 micrometers.

15. The article of claim 14, which also contains at least one other filler selected from the group consisting of calcium carbonate, mica, glass fibers, silica-alumina ceramic alloy, hydrated alumina silicate, calcium sulfate, talc and solid microspheres.

16. The article of claim 15, wherein said at least one other filler replaces up to 85%, by weight, of the hollow microsphere content.

17. The article of claim 6 having a glass transition temperature over 125° C. coupled with a coefficient of thermal linear expansion of less than $50 \times 10^{-6}$ in/in/°C. in the −30°–30° C. range and of less than $60 \times 10^{-6}$ in/in/°C. in the 25°–100° C. range and comprising the cured product of (a) from about 40–45%, by weight, of a polymethylene polyphenyl isocyanate, (b) from about 20–25%, by weight, of an amined-based triol, (c) from about 10–15%, by weight, of a polyether triol, (d) from about 5–8%, by weight, of a molecular sieve and (e) from about 10–20% by weight, of hollow glass microspheres having a diameter of from 5–250 micrometers.

* * * * *